(12) United States Patent
Hsu

(10) Patent No.: US 6,513,930 B2
(45) Date of Patent: Feb. 4, 2003

(54) CONTACT LENS CAPABLE OF LETTING EYEBALL SEEM LARGER

(76) Inventor: Chung Wei Hsu, P.O. Box 26-757, Taipei (TW), 106

(*) Notice: Subject to any disclaimer, the term of this patent is extended or adjusted under 35 U.S.C. 154(b) by 5 days.

(21) Appl. No.: 09/881,153

(22) Filed: Jun. 13, 2001

(65) Prior Publication Data

US 2002/0191152 A1 Dec. 19, 2002

(51) Int. Cl.[7] .................................................. G02C 7/04
(52) U.S. Cl. ....................................... 351/162; 351/177
(58) Field of Search .......................... 351/160 R, 160 H, 351/161, 162, 177

(56) References Cited

U.S. PATENT DOCUMENTS 5,905,561 A * 5/1999 Lee et al. .................... 351/162

* cited by examiner

Primary Examiner—Scott J. Sugarman
(74) Attorney, Agent, or Firm—Rosenberg, Klein & Lee

(57) ABSTRACT

The present invention relates to a contact lens capable of letting the eyeball seem larger. A colored pattern of hollow annular shape is printed on the outer surface of the contact lens. The colored pattern is composed of irregularly arranged shapes. A blank portion is inside the colored pattern. The colored pattern extends inwards to shrink the inner diameter thereof so that the blank portion is smaller than the eyeball. When the contact lens is worn onto the eye, the colored pattern surrounds the periphery of the eyeball to obtain the effect of letting the eyeball seem larger, and an inner edge of the colored pattern overlaps the eyeball to prevent the white of the eye from being exposed, hence effectively enhancing natural feel.

4 Claims, 5 Drawing Sheets

CONTACT LENS CAPABLE OF LETTING EYEBALL SEEM LARGER

FIELD OF THE INVENTION

The present invention relates to a contact lens capable of letting the eyeball seem larger and, more particularly, to a contact lens capable of letting the eyeball seem larger to make up for the pity of people with smaller preventing the white of the eye from being exposed, and increasing natural feel.

BACKGROUND OF THE INVENTION

Glasses are tools worn in front of eyes to rectify the eyesight. Contact lenses are a kind of glasses widely used by people. Along with the enhancement of standards of lives, people more and more emphasize the wearing delicacy of contact lenses. FIG. 1 shows a prior art contact lens 10a capable of discoloring the eyeball. A colored pattern 11a of hollow annular shape is printed on the contact lens 10a. The colored pattern 11a can be composed of points or lines. A blank portion 12a without pattern is inside the colored pattern 11a. The blank portion 12a is roughly the same size as the pupil, and the colored pattern 11a is roughly the same size as the eyeball.

When the contact lens 10a is worn onto the eye, the color on the colored pattern 11a can be exploited to discolor the eyeball. Except having the effect of discoloring the eyeball, the contact lens 10a has no effect of letting the eyeball seem larger. For people with smaller eyeballs, delicacy can be enhanced if the eyeball can properly seem larger.

Therefore, a contact lens capable of letting the eyeball seem larger has been proposed. FIG. 2 shows a contact lens 20a capable of letting the eyeball seem larger. A colored pattern 21a of hollow annular shape is printed on the outer surface of the contact lens 20a. The colored pattern 21a is composed of irregularly arranged and more natural shapes. The color of t is preferred to be the same as that of the eyeball. A blank portion 22a without pattern is inside the colored pattern 21a. The blank portion 22a is roughly the same size as the eyeball so that the colored pattern 21a can surround the periphery of the eyeball.

When the contact lens 20a is worn onto the eye, because the colored pattern 21a surrounds the periphery of the eyeball, the effect of letting the eyeball seem larger can be obtained to make up for the pity of people with smaller eyeballs. However, when a general contact lens is worn onto the eye, it will slide thereon. Although the contact lens 20a already has the effect of letting the eyeball seem larger, if the contact lens 20a is worn onto the eye and slides, the colored pattern 21a surrounding the periphery of the eyeball will shift so that the inner edge of the colored pattern 21a cannot align with the outer edge of the eyeball, letting the white of the eye be exposed between the colored pattern 21a and the eyeball.

Moreover, because the sizes of people's eyeballs differ, the situation that the inner edge of the colored pattern 21a does not align with the outer edge of the eyeball will also occur. Additionally, when the contact lens 20a is worn onto the eye, the situation that the inner edge of the colored pattern 21a does not align with the outer edge of the eyeball may occur due to misalignment. Because of the above reasons, the white of the eye may be exposed between the colored pattern 21a and the eyeball, badly affecting the wearing delicacy of contact lens. Moreover, the contact lens is unnatural.

Accordingly, the above contact lens capable of letting the eyeball seem larger has inconvenience and drawbacks in practical use. The present invention aims to resolve the problems in the prior art.

SUMMARY OF THE INVENTION

The primary object of the present invention is to provide a contact lens capable of letting the eyeball seem larger. When the contact lens of the present invention is worn onto the eye, because a colored pattern thereof surrounds the periphery of the eyeball, the effect of letting the eyeball seem larger can be obtained. Moreover, the inner edge of the colored pattern can overlap the eyeball. When the contact lens slides on the eye, is worn onto eyes with eyeballs of different sizes, or does not align well, the white of the eye still will not be exposed between the colored pattern surrounding the periphery of the eyeball and the eyeball. In other words, the contact lens of the present invention can tolerate wearing deviation to avoid the situation of exposing the white of the eye, hence not affecting the wearing delicacy and being more natural.

To achieve the above object, the present invention provides a contact lens capable of letting the eyeball seem larger. A colored pattern of hollow annular shape is printed on the outer surface of the contact lens. The colored pattern is composed of irregularly arranged shapes. A blank portion without pattern is inside the colored pattern. The colored pattern extends inwards to let the blank portion be smaller than the eyeball. A contact lens capable of letting the eyeball seem larger of the present invention is thus formed.

The various objects and advantages of the present invention will be more readily understood from the following detailed description when read in conjunction with the appended drawing, in which:

DETAILED DESCRIPTION OF THE PREFERRED EMBODIMENTS

Figure 1:
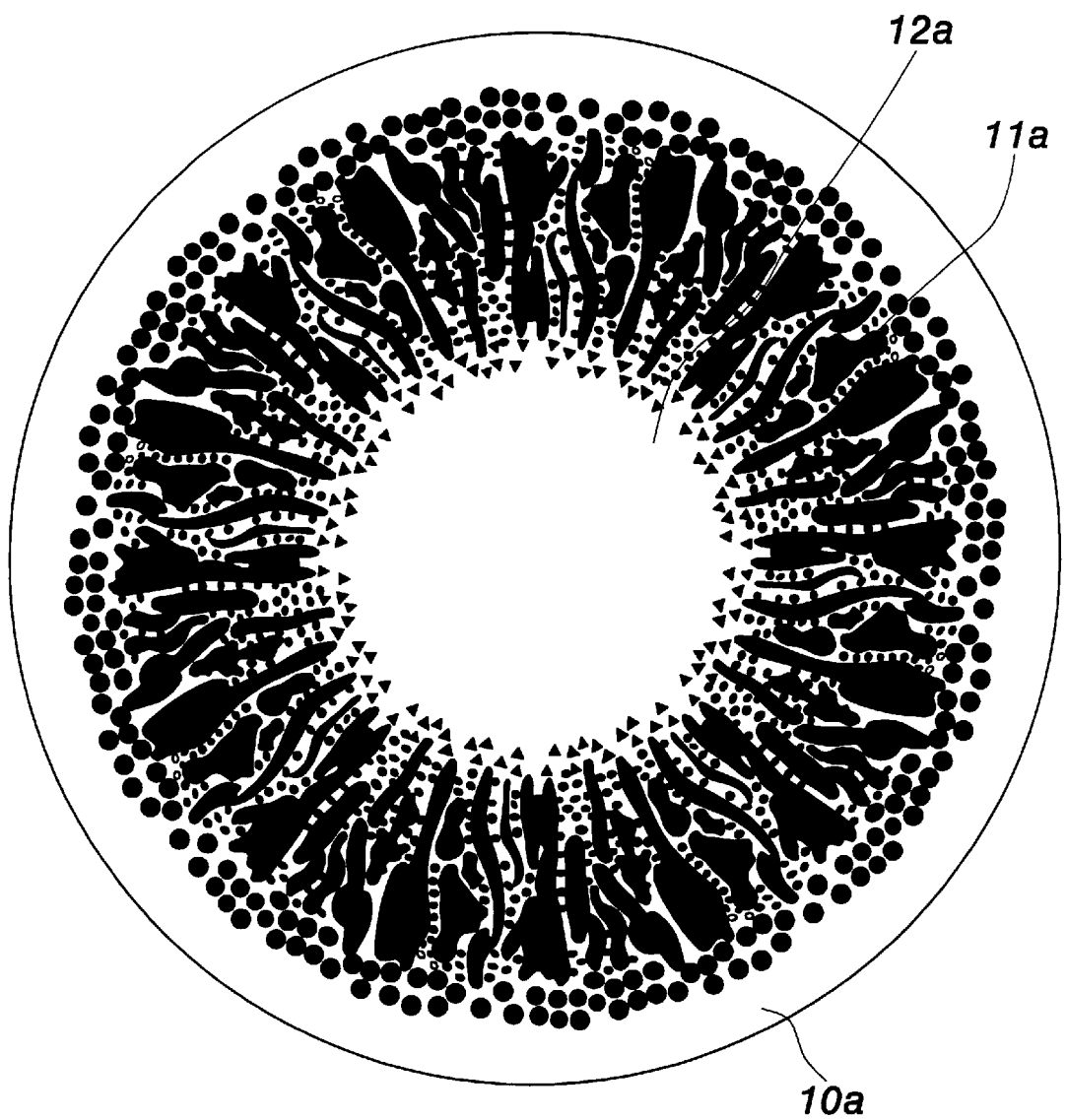
FIG. 1 is a front view of a prior art contact lens capable of discoloring the eyeball.
Figure 2:
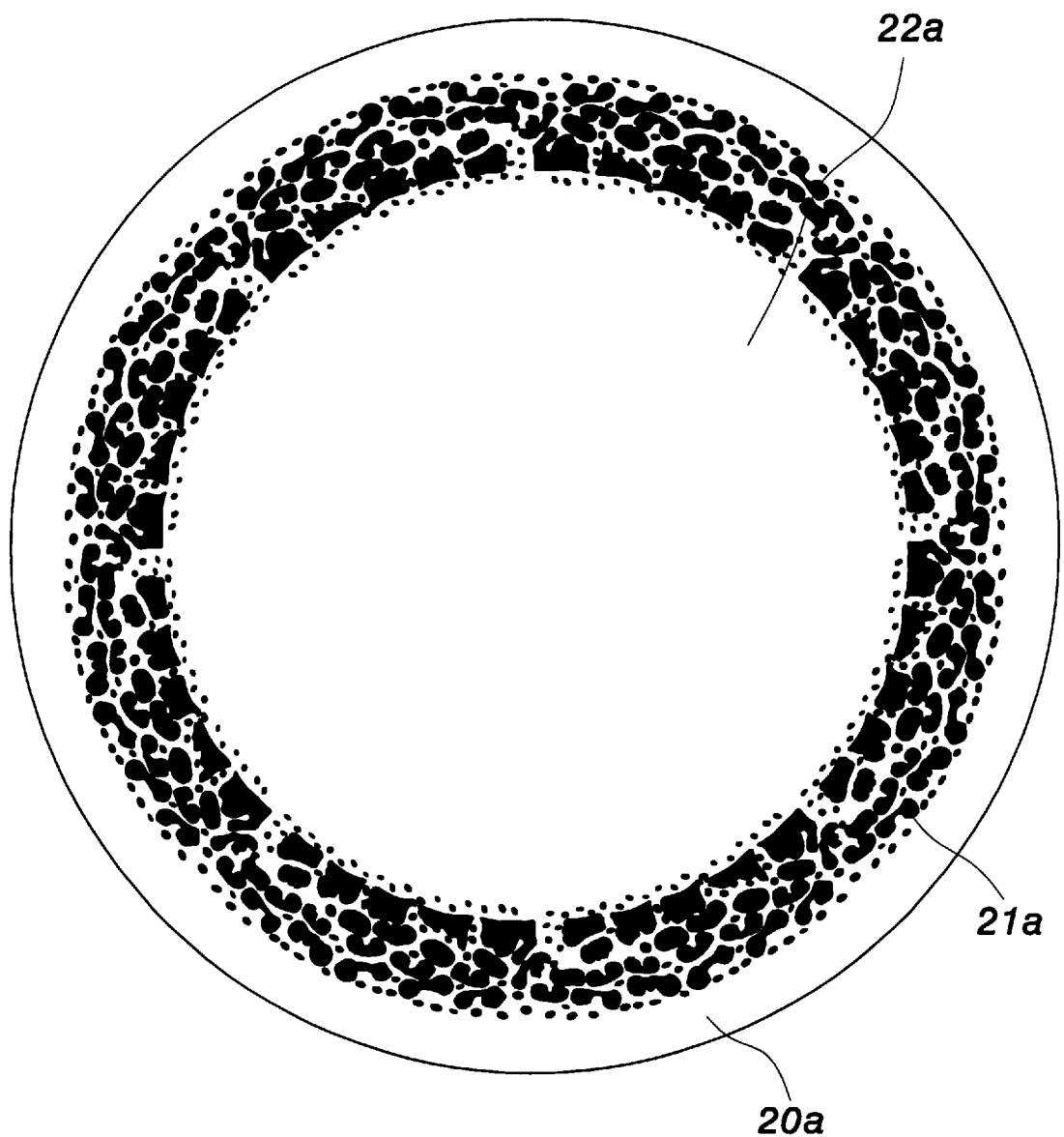
FIG. 2 is a front view of a prior art contact lens capable of letting the eyeball seem larger.
Figure 3:
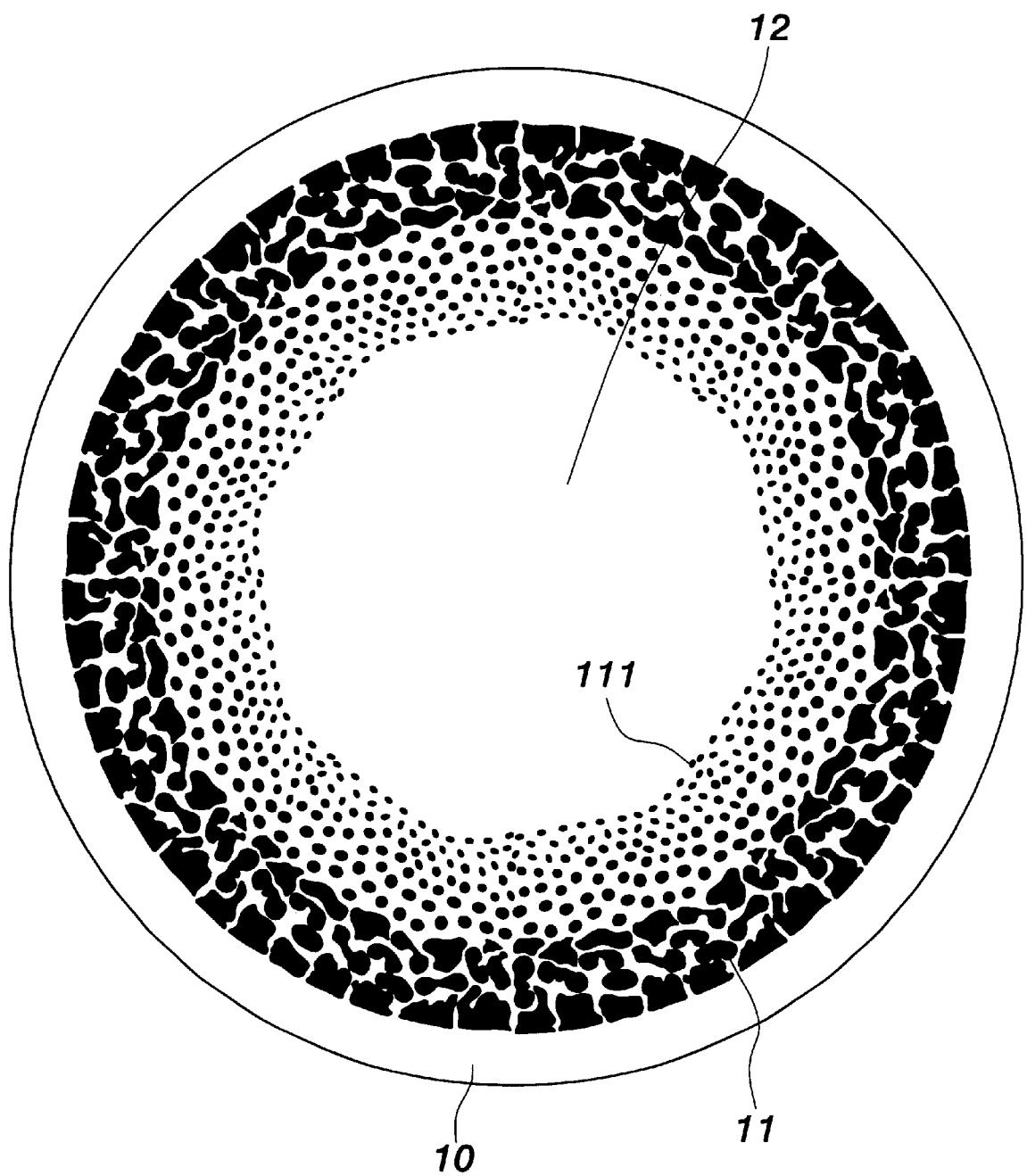
FIG. 3 is a front view of the present invention.
Figure 4:
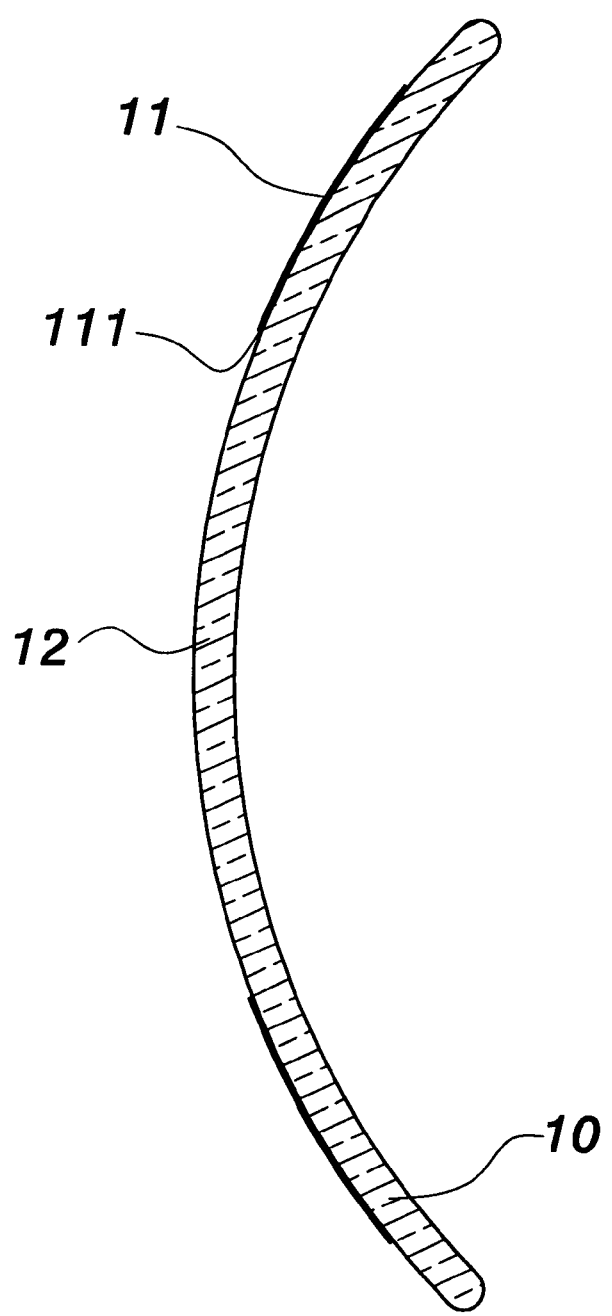
FIG. 4 is a side view of the present invention.

As shown in FIGS. 3 and 4, the present invention relates to a contact lens 10a capable of letting the eyeball seem larger. A colored pattern 11 is printed on the outer surface of the contact lens 10. The colored pattern 11 is composed of more natural and irregularly arranged net points. The colored pattern of net points 11 extends inwards to shrink the inner diameter thereof The colored pattern 11 is designed to be outside dense and inside sparse to show graded variation.

The color of the colored pattern 11 is preferred to be the same as that of the eyeball. A blank portion 12 without pattern is inside the colored pattern 11. The diameter of the blank portion 12 is smaller than that of the prior art so that the blank portion is smaller than the eyeball. In other words, the diameter of the blank portion is smaller than that of the eyeball. The diameter of an inner edge 111 of the colored pattern 11 is correspondingly shrunk so that not only can the colored pattern 11 surround the periphery of the eyeball, the inner edge 111 can also overlap the eyeball. Moreover, the inner edge 111 can be of wavy shape.

Figure 5:
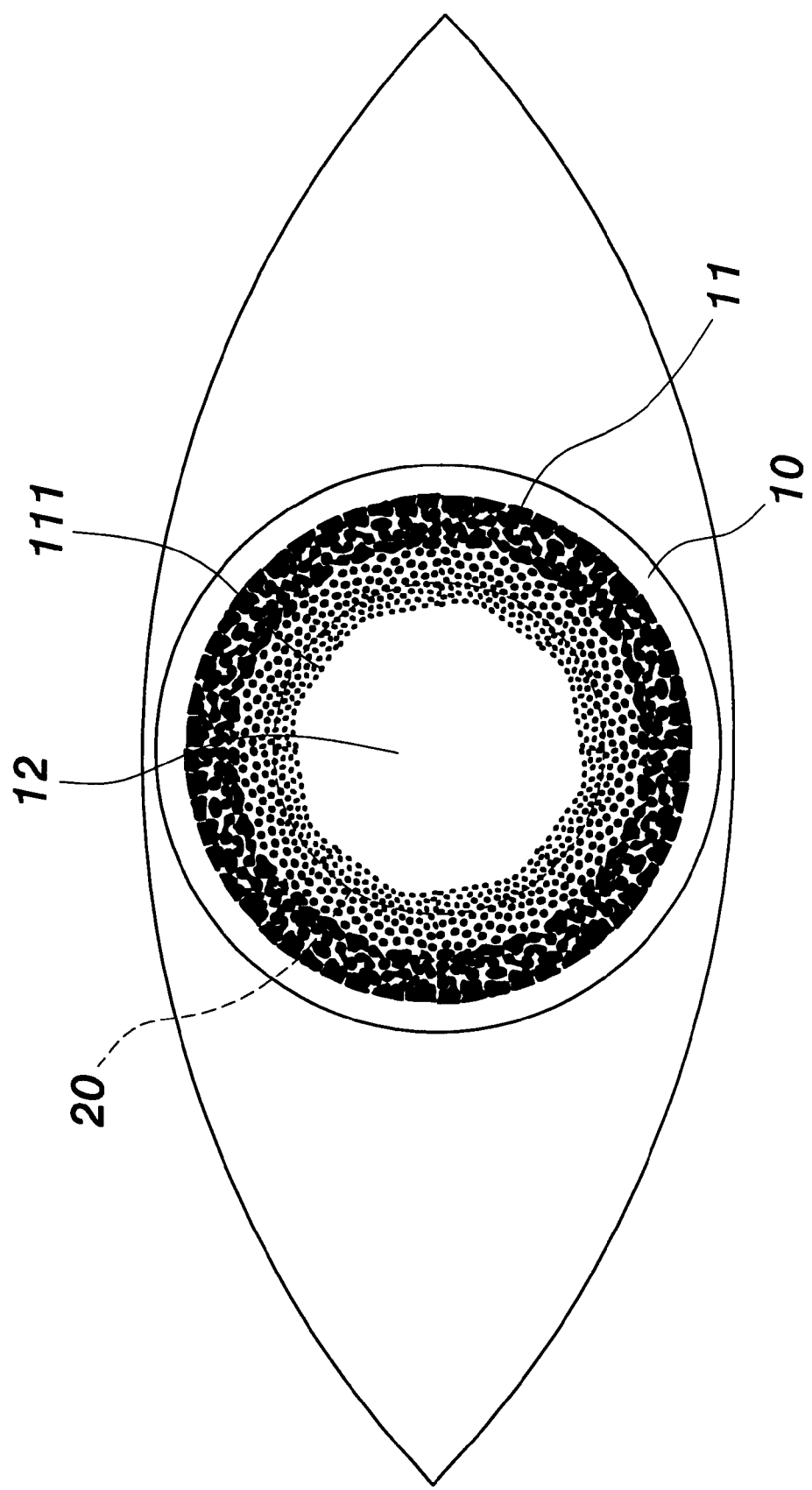
FIG. 5 is a diagram showing the use state of the present invention.

As shown in FIG. 5, when the contact lens 10 is worn onto the eye, because the colored pattern 11 surrounds the periphery of the eyeball 20, the effect of letting the eyeball 20 seem larger can be obtained to make up for the pity of people with smaller eyeballs.

In addition to having the effect of letting the eyeball seem larger, when the contact lens 10 is worn onto the eye, because the blank portion 12 is smaller than the eyeball and the inner edge 111 of the colored pattern 11 is correspondingly shrunk, the colored pattern can surround the periphery of the eyeball, and the inner edge 111 can overlap the eyeball. Therefore, when the contact lens 10 slides on the eye, is worn onto eyes with eyeballs of different sizes, or does not align well, the white of the eye still will not be exposed between the eyeball 20 and the colored pattern 11 surrounding the periphery of the eyeball 20. The contact lens 10 of the present invention can tolerate wearing deviation to avoid the situation of exposing the white of the eye, hence not affecting the wearing delicacy and being more natural.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A contact lens capable of letting the eyeball seem larger, a colored pattern being printed on the outer surface of said contact lens, a blank portion without pattern being inside said colored pattern, said colored pattern extending inwards to shrink the inner diameter thereof so that said blank portion is smaller than the eyeball;

whereby when said contact lens is worn onto the eye, said colored pattern surrounds the periphery of the eyeball to obtain the effect of letting the eyeball seem larger, and an inner edge of said colored pattern overlaps the eyeball to prevent the white of the eye from being exposed.

2. The contact lens capable of letting the eyeball seem larger as claimed in claim 1, wherein said colored pattern is composed of irregularly arranged net points, and said net points of said colored pattern are outside dense and inside sparse to show graded variation.

3. The contact lens capable of letting the eyeball seem larger as claimed in claim 1, wherein said inner edge of said colored pattern can be of wavy shape.

4. The contact lens capable of letting the eyeball seem larger as claimed in claim 1, wherein the color of said colored pattern is preferred to be the same as that of the eyeball.

* * * * *